United States Patent [19]
Willenegger et al.

[11] Patent Number: 5,933,781
[45] Date of Patent: Aug. 3, 1999

[54] PILOT BASED, REVERSED CHANNEL POWER CONTROL

[75] Inventors: Serge Willenegger; Edward G. Tiedemann, Jr.; Yu-Cheun Jou, all of San Diego; Joseph P. Odenwalder, Del Mar, all of Calif.

[73] Assignee: Qualcomm Incorporated, San Diego, Calif.

[21] Appl. No.: 08/792,531

[22] Filed: Jan. 31, 1997

[51] Int. Cl.[6] .............................. H04B 7/005; H04B 7/26
[52] U.S. Cl. ........................... 455/522; 455/69; 370/342; 375/200
[58] Field of Search .............................. 455/69, 522, 437, 455/442, 226.2, 226.3, 13.4; 370/335, 342; 375/200

[56] References Cited

U.S. PATENT DOCUMENTS

| | | |
|---|---|---|
| 4,112,257 | 9/1978 | Frost . |
| 4,123,718 | 10/1978 | Lampert et al. . |
| 4,765,753 | 8/1988 | Schmidt . |
| 4,777,653 | 10/1988 | Bonnerot et al. .......................... 455/69 |
| 4,811,421 | 3/1989 | Havel et al. ................................ 455/69 |
| 4,868,795 | 9/1989 | McDavid et al. . |
| 4,870,698 | 9/1989 | Katsuyama et al. . |
| 4,901,307 | 2/1990 | Gilhousen et al. . |
| 5,056,109 | 10/1991 | Gilhousen et al. . |
| 5,093,840 | 3/1992 | Schilling . |
| 5,101,501 | 3/1992 | Gilhousen et al. . |
| 5,103,459 | 4/1992 | Gilhousen et al. . |
| 5,107,487 | 4/1992 | Vilmur et al. . |
| 5,128,965 | 7/1992 | Henriksson . |
| 5,204,876 | 4/1993 | Bruckert et al. . |
| 5,220,678 | 6/1993 | Feei ........................................... 455/69 |
| 5,245,629 | 9/1993 | Hall . |
| 5,257,293 | 10/1993 | Gilhousen et al. . |
| 5,265,119 | 11/1993 | Gilhousen et al. . |
| 5,267,262 | 11/1993 | Wheatley, III . |
| 5,305,468 | 4/1994 | Bruckert et al. .......................... 455/69 |
| 5,383,219 | 1/1995 | Wheatley, III et al. . |
| 5,390,338 | 2/1995 | Bodin et al. . |
| 5,450,616 | 9/1995 | Rom .......................................... 455/69 |
| 5,465,399 | 11/1995 | Oberholtzer et al. ..................... 455/69 |
| 5,487,180 | 1/1996 | Ohtake . |
| 5,551,057 | 8/1996 | Mitra ......................................... 455/522 |
| 5,799,010 | 8/1998 | Lomp et al. .............................. 370/335 |
| 5,835,847 | 11/1998 | Gilmore et al. .......................... 455/69 |

FOREIGN PATENT DOCUMENTS

| | | |
|---|---|---|
| 0668665 | 8/1995 | European Pat. Off. . |
| 9406218 | 3/1994 | WIPO .............................. H04Q 7/04 |
| 9702665 | 1/1997 | WIPO . |

*Primary Examiner*—Reinhard J. Eisenzopf
*Assistant Examiner*—Lester G. Kincaid
*Attorney, Agent, or Firm*—Russell B. Miller; Bruce W. Greenhaus; Kent D. Baker

[57] ABSTRACT

A signal is transmitted at a transmit power and includes a traffic channel transmitted at a traffic channel transmit power, and a pilot channel transmitting at a pilot channel transmit power. The receive energy of the pilot channel is measured, and a decrease power control command is generating when the receive energy is greater than a receive energy threshold. If the receive energy is less than the receive energy threshold, an increase power control command is generated. The power control command is transmitted to the system generating the signal.

10 Claims, 3 Drawing Sheets

PILOT BASED, REVERSED CHANNEL POWER CONTROL

BACKGROUND OF THE INVENTION

I. Field of the Invention

The present invention relates to radio frequency signal communications. More particularly, the present invention relates to a novel and improved method for performing power control.

II. Description of the Related Art

The IS-95 Over-the-Air (OTA) Interface Standard defines a set of RF signal modulation procedures for implementing a digital cellular telephone system. The IS-95 Standard, and its derivatives, such as IS-95A and ANSI J-STD-008 (referred to collectively as the IS-95 Standard), are promulgated by the Telecommunications Industry Association (TIA) to insure the operability between telecommunications equipment manufactured by different vendors.

The IS-95 Standard has received enthusiastic reception because it uses the available RF bandwidth more efficiently than previously existing cellular telephone technologies. This increased efficiency is provided by using Code Division Multiple Access (CDMA) signal processing techniques in combination with extensive transmit power control to increase the frequency reuse of a cellular telephone system.

FIG. 1 illustrates a highly simplified digital cellular telephone system configured in a manner consistent with the use of IS-95. During operation, telephone calls and other communications are conducted by exchanging data between subscriber units 1 (generally cellular telephones) and base stations 2 using RF signals. Typically, communications are further conducted via wireline connections from base stations 2 through base station controllers (BSC) 4 and mobile switching center (MSC) 6 to either public switch telephone network (PSTN) 8, or to another subscriber unit 1. BSC's 4 and MSC 6 typically provide mobility control, call processing, and call routing functionality.

The RF signal transmitted from a base station 2 to a set of subscriber units 1 is referred to as the forward link signal, and the RF signal transmitted from a subscriber unit 1 to a base station 2 is referred to as the reverse link signal. The IS-95 Standard calls for subscriber units 1 to provide telecommunications service by transmitting user data such as digitized voice data via the reverse link signal. The reverse link signal is comprised of a single traffic channel, and therefore is often referred to as a "non-coherent" signal because it does not include a pilot channel.

Within the reverse link signal, user data is transmitted at a maximum data rate of 8.6 or 13.35 kbps, depending on which rate set from a set of rate sets provided by IS-95 is selected. The use of a single channel, non-coherent, reverse link signal simplifies the implementation of an IS-95 cellular telephone system by eliminating the need for synchronization between a set of subscriber units 1 communicating with a single base station 2.

As mentioned above, IS-95 incorporates extensive transmit power in order to more efficiently utilize the available RF bandwidth. In accordance with IS-95, this power control is performed by measuring the strength or quality of the reverse link traffic channel when received at the base station and generating a power control command based on that measurement. The power control command is transmitted to the subscriber unit via the forward link signal.

The subscriber unit responds to the power control command by increasing or decreasing the transmit power of the reverse link signal based on the power control command. This power control adjustment is performed repeatedly at rates on the order of 800 times per second in order to maintain the reverse link signal transmit power at the minimum necessary to conduct communications. Additionally, IS-95 also calls for transmit duty cycle of the reverse link signal to be adjusted in response to changes in voice activity in 20 millisecond increments. Thus, when the transmit duty cycle is lowered, the signal is transmitted at either a set point, or the signal is gated and not transmitted at all. During periods when the reverse link signal is gated, the base station generates incorrect power control increase commands because the reverse link signal is not detected. The subscriber unit can ignore these false increase commands, however, because it knows when the reverse link signal was and was not transmitted, and therefore when the false increase commands are generated.

To satisfy the ever increasing demand to transmit digital data created by networking technologies such as the world-wide web, a higher rate and more complex transmission system incorporating a multi-channel, coherent, reverse link signal is provided in co-pending U.S. patent application Ser. No. 08/654,443 entitled "High Data Rate CDMA Wireless Communications System" filed on May 28, 1996, assigned to the assignee of the present invention and incorporated herein by reference ('443 application). In particular, the above referenced patent application describes a reverse link signal including at least one traffic channel, a power control channel, and a pilot channel.

The use of a multi-channel reverse link signal provides various advantages including increased flexibility because different types of data may be transmitted simultaneously over the set of channels. Additionally, providing a pilot channel in the multi-channel reverse link signal facilitates coherent processing of the reverse link signal which improves processing performance.

It is also desirable to perform reverse link power control for the high speed link described in the above referenced patent application in order to continue to make efficient use of the available RF bandwidth. In one implementation of the high data rate system described in the above referenced patent application, however, the reverse link signal is transmitted continuously, with the transmit power of the traffic channel being adjusted incrementally in 20 millisecond increments in response to changes in the data rate, typically brought about by changes in the voice activity. That is, the traffic channel is transmitted at a reduced power level rather than at a reduced duty cycle during each 20 ms increment when the data rate decreases. Typically, the transmit power could be one of four levels that can be used for one of four voice activity increments, however, any number of transmit power levels can be used.

Thus, the transmit power for the high data rate system varies over wider range values than for IS-95, which is either transmitted at the set point or completely gated. Also, the transmit power in the higher rate system can remain low for a longer period of time than for IS-95, since IS-95 requires at least some set point transmissions during each frame, while no set point transmissions may occur for several frames for the higher rate system if the data rate remains low. Since the system receiving the high rate link will not know whether this reduction is due to increased distance, or simply a result of the reduced data rate, it will be difficult to determine the appropriate power control command to transmit. Since it is nonetheless desirable to perform reverse link power control in this high rate system, a new method for reverse link power control is required.

SUMMARY OF THE INVENTION

The present invention is a novel and improved method for performing reverse link power control. A reverse link signal transmitted at a reverse link transmit power includes at least a traffic channel transmitted at a traffic channel transmit power, and a pilot channel transmitted at a pilot channel transmit power. At a receive system the receive energy of the pilot channel is measured, and a decrease power control command is generated when the receive energy is greater than a receive energy threshold. If the receive energy is less than the receive energy threshold an increase power control command is generated. The power control command is transmitted to the system generating the reverse link signal.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 2:
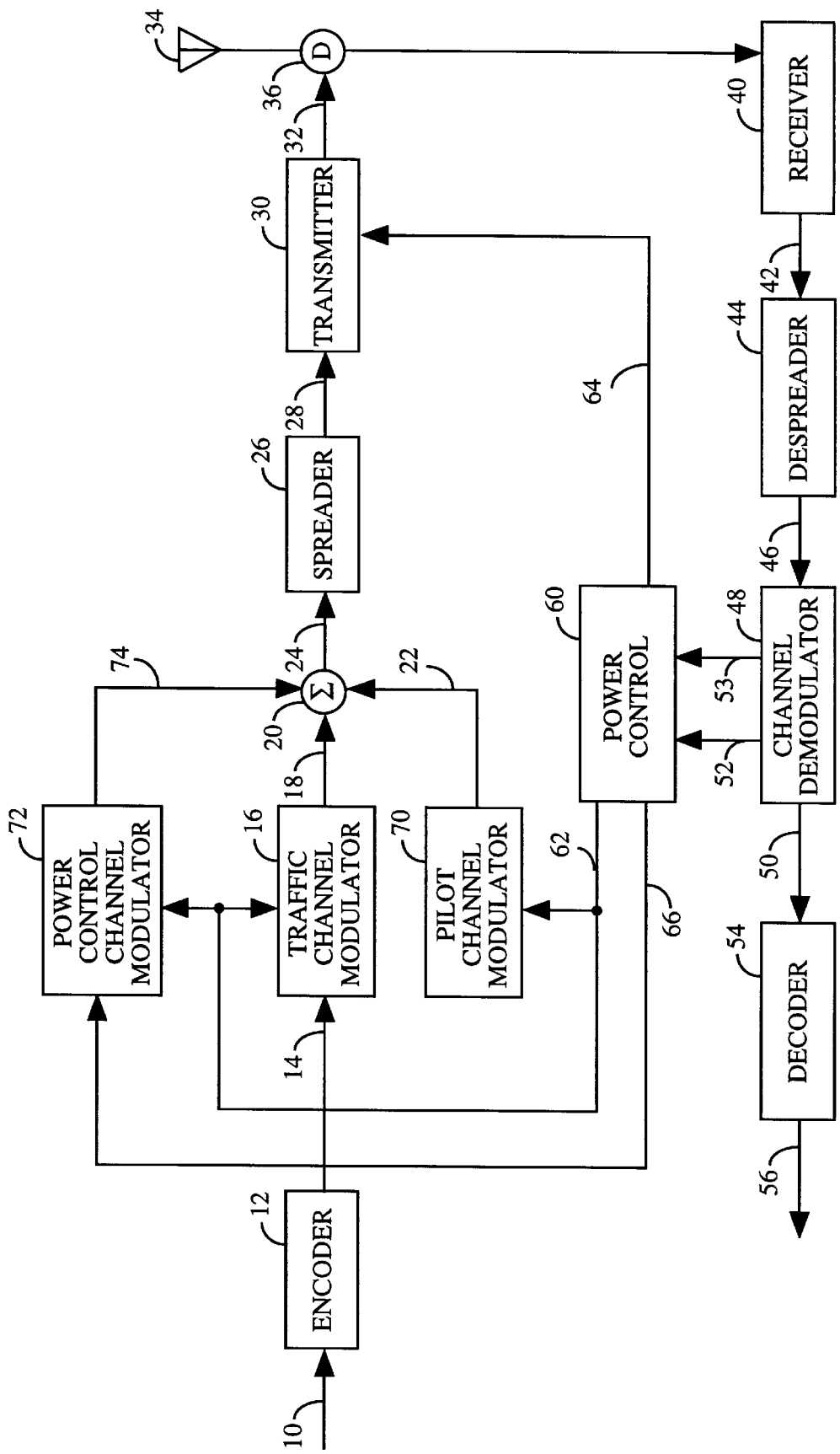
FIG. 2 is a block diagram of a subscriber unit or cellular telephone configured in accordance with one embodiment of the invention.

FIG. 2 is a block diagram of a subscriber unit or cellular telephone configured with one embodiment of the invention. During operation encoder 12 convolutionally encodes user data 10 to generate encoded symbols 14. User data 10 is typically vocoded voice information provided at a variable data rate, although any type of digital data may be transmitted. The user data is processed in 20 ms increments, or frames, in which the amount of data contained in each frame varies in response to changes in the data rate.

Traffic channel modulator 16 modulates encoded symbols 14 with a traffic channel code to generate traffic channel symbols 18. Additionally, traffic channel modulator 16 increases or decreases the gain of the traffic channel in response to channel gain adjust command 62 as described below. The gain of the traffic channel is further adjusted by traffic channel modulator 16 in response to changes in the amount of data being transmitted during each 20 ms frame.

Pilot channel modulator 70 generates pilot channel symbols 22 and also adjusts the amplitude of the pilot channel in response to channel gain adjust command 62. Similarly, power control channel modulator 72 generates power control symbols 74 in response to forward link power control command 66, and adjusts the amplitude of power control symbols 74 in response to channel gain adjust command 62.

Summer 20 sums traffic channel symbols 18 with pilot channel symbols 22 and power control symbols 74 to generate summed symbols 24. Spreader 26 modulates summed symbols 24 with one or more pseudorandom noise (PN) spreading codes to generate spread data 28. Transmitter 30 upconverts spread data 28 to a desired RF frequency generating reverse link signal 32 which is transmitted from antenna system 34 via diplexer 36. Additionally, transmitter 30 adjusts the transmit power of reverse link signal 32 in response to reverse link gain adjust command 64. In a preferred embodiment of the invention, the bandwidth of the data from spreader 26 is 1.2288 MHz in accordance with the high data rate system as described in the above referenced '443 application.

Additionally, in one embodiment of the invention power control 60 also performs "open loop" power control by adjusting reverse link gain adjust command 64 in response to changes in the received energy of the forward link signal $E_{FL}$. In particular, when the power level of the forward link signal $E_{FL}$ decreases, the transmit power of the reverse link signal is increased proportionally by increasing gain adjust command 64. The gain of the reverse link signal is increased in response to a decreasing forward link signal because the reverse link signal is likely to experience similar transmit conditions, and therefore the receive power of the reverse link signal will also decrease at the base station. By initiating a change in the reverse link transmit power upon detecting the change in the forward link power, compensation for this change can begin more quickly than with the use of power control commands alone.

Figure 1:
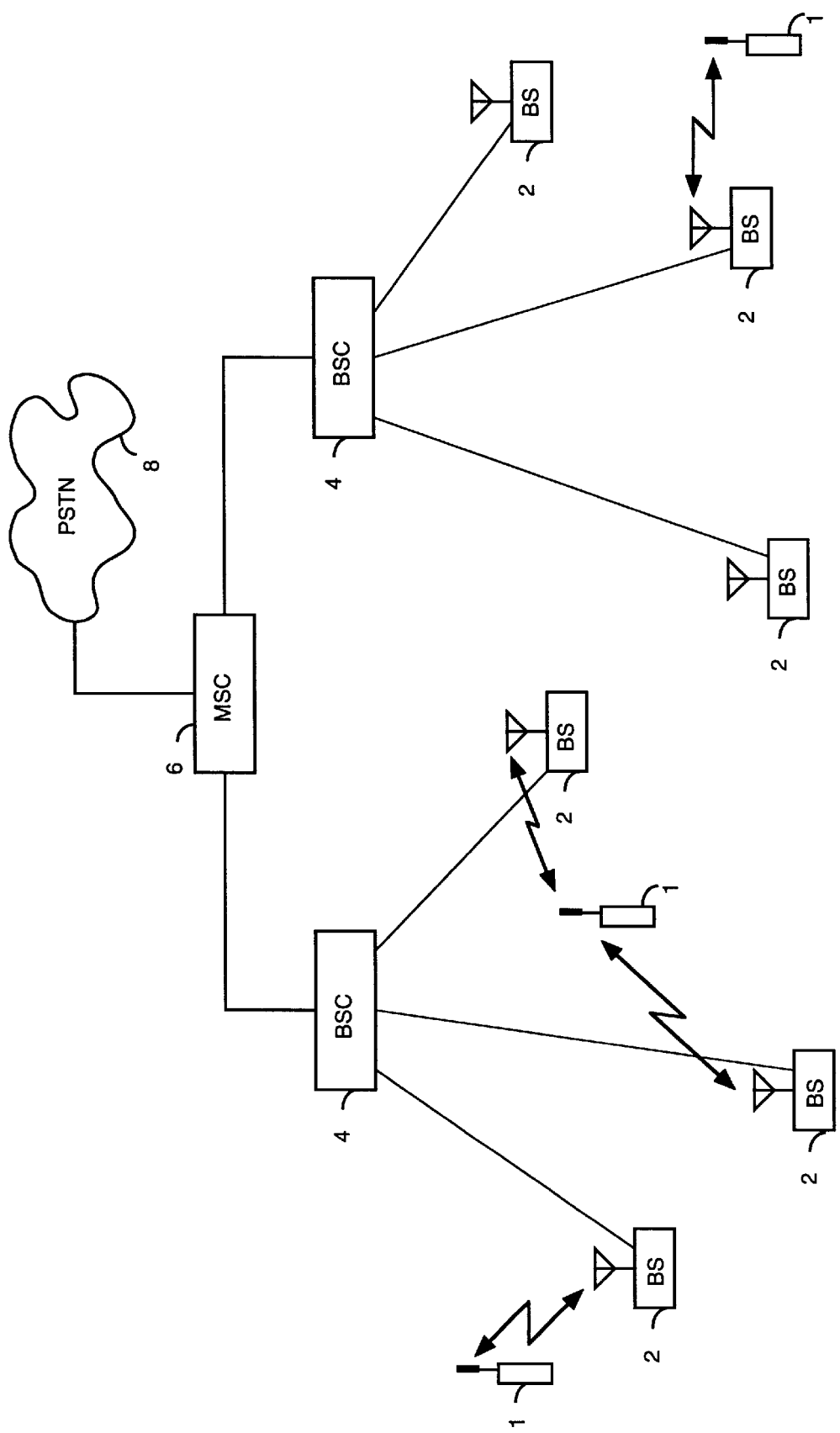
FIG. 1 is a block diagram of a cellular telephone system.

Simultaneous with the transmit processing described above, receiver 40 within subscriber unit 11 receives one or more forward link RF signals by way of antenna system 34 and diplexer 36. These forward link signals are typically generated within a base station such as that shown in FIG. 1. Receiver 40 digitizes and downconverts the forward link signals yielding digitized baseband data 42. The digitized baseband data 42 is demodulated by despreader 44 using a pseudorandom noise (PN) spreading code yielding despread samples 46. Channel demodulator 48 demodulates despread samples 46 with a channel code yielding soft decision data 50, reverse link power control command 52, and strength measurement 53. Decoder 54 decodes the soft decision data 50 to generate user data 56. Various types of decoding are well known in the art including trellis decoding and Viterbi decoding.

Reverse link power control command 52 and strength measurement 53 are received by power control system 60. Power control system 60 responds by generating gain adjust commands 62 and 64, as well as forward link power control command 66. In the preferred embodiment of the invention, reverse link power control command 52 is received within the forward link signal in the form of power control bit, and strength measurement 53 is the measured energy value of the received forward link signal ($E_{FL}$). Power control system 60 is typically comprised of a microprocessor controlled by a set of software instructions, the use of which is well known.

To generate gain adjust commands 62 and 64, power control system 60 examines reverse link power control command 52 to determine whether an increase or decrease command has been received, and whether that command is directed towards a specific reverse link channel or towards the set of reverse link channels. For example, the reverse link power control command 52 may request an increase in the transmit power of the traffic channel. If so, power control system 60 increases the amplitude of the traffic channel. The increase is performed via the application of channel gain adjust command 62 to traffic channel modulator 16.

Alternatively, reverse link power control command 52 may request an increase in the transmit power of the entire reverse link signal. If so, power control system 60 increases the transmit power of the reverse link signal via reverse link gain adjust command 64 applied to transmitter 30. Similarly, reverse link power control command 52 may request an increase in the transmit power control pilot channel. If so, power control system 60 increases the amplitude of the pilot channel via gain channel adjust command 62.

Those skilled in the art will recognize that the amplitude and transmit power may be adjusted at other stages of the transmit processing, rather than at the stages shown. For example, the total transmit power of the reverse link signal may be adjusted within spreader 26 or other systems introduced into the transmit processing sequence.

Power control system 60 also receives the measured energy value of the received forward link signal ($E_{FL}$). Power control system 60 responds to the measured energy value of the forward link signal by generating forward link power control command 66 requesting either an increase or decrease in the transmit power of the forward link signal which is applied to power control channel modulator 72. Power control channel modulator 72 modulates the power control command with a power control channel code generating power control symbols 74 which are applied to summer 20 and therefore transmitted to the base station in the reverse link signal. In the preferred embodiment of the invention forward link power control command 66 is generated in accordance with U.S. patent application Ser. No. 08/722,763 entitled "Method and Apparatus for Measuring Link Quality in a Spread Spectrum Communication System" filed Sep. 27, 1996, assigned to the assignee of the present invention, and incorporated herein by reference.

Figure 3:
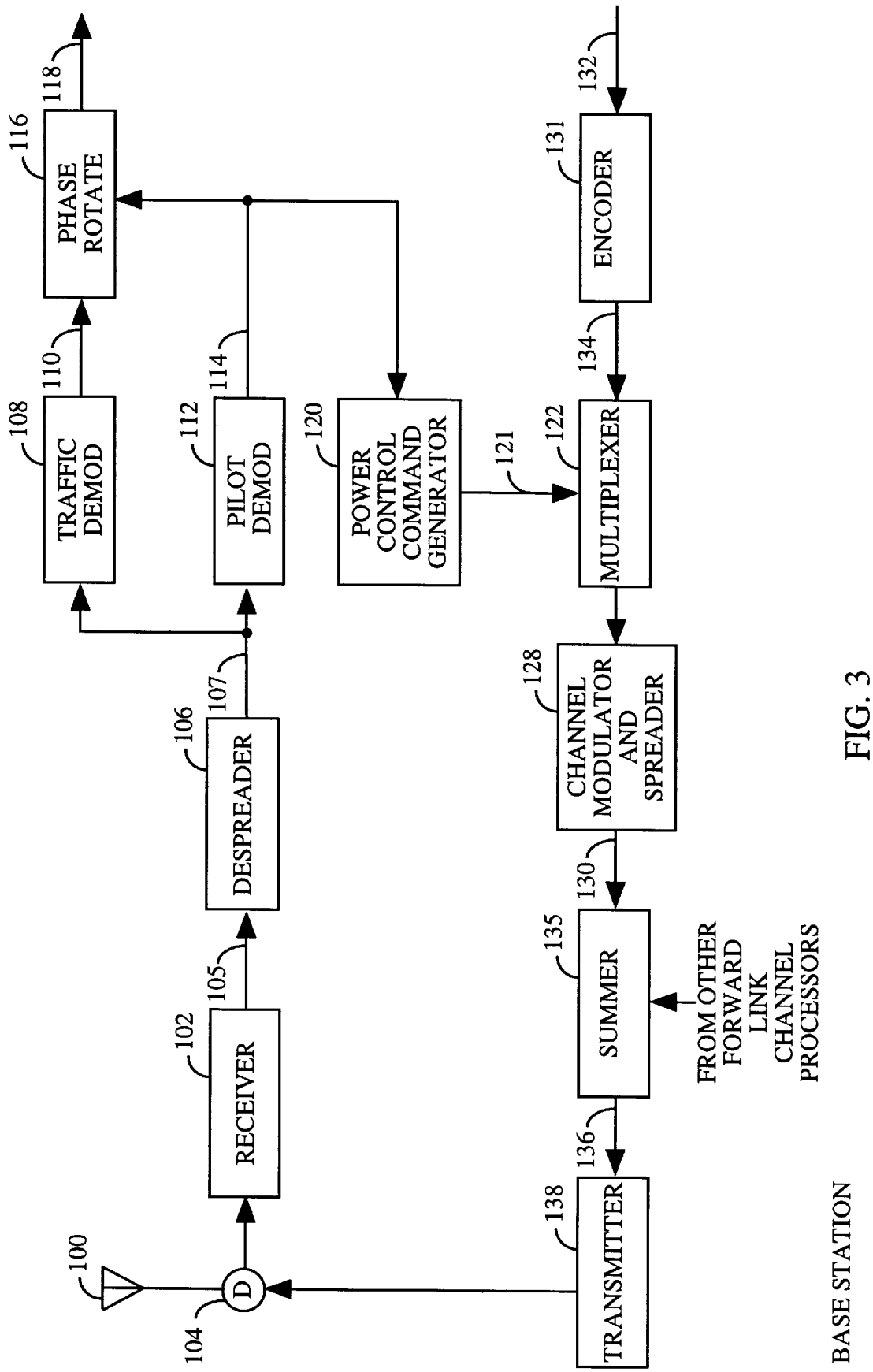
FIG. 3 is a block diagram of a base station configured in accordance with an exemplary embodiment of the present invention.

FIG. 3 is a block diagram of a base station configured in accordance with the use of the present invention. The reverse link signal transmitted from the subscriber unit of FIG. 2 is received by antenna system 100 and applied to receiver 102 through diplexer 104. Receiver 102 digitizes and downconverts the reverse link signal generating digitized baseband samples 105. Despreader 106 performs despreading on the digitized baseband samples 105 using a PN spreading code generating despread data 108. Traffic channel demodulator 108 demodulates the despread data using a traffic channel code generating traffic channel soft decision data 110. Pilot demodulator 112 demodulates the despread data 107 using a pilot channel code generating pilot data 114. Phase rotate 116 uses pilot data 114 to phase rotate traffic channel soft decision data 110 yielding phase adjusted traffic data 118.

Power control command generator 120 measures the reverse link pilot channel energy ($E_P$) and compares it with a desired pilot channel energy threshold ($E_{PT}$). In a first embodiment of the invention, if the reverse link pilot channel energy ($E_P$) exceeds the desired pilot energy $E_{PT}$, a reverse link power control command 121 requesting a decrease in the transmit power of the entire reverse link signal is generated by power control command generator 120 and applied to multiplexer 122. If the reverse link pilot energy ($E_P$) is less than the desired pilot energy ($E_{PT}$), a reverse link power control command 121 requesting an increase in the transmit power of the entire reverse link signal is generated by power control command generator 120 and also applied to multiplexer 122. The power control command typically takes the form of a bit or set of bits.

In alternative embodiments of the invention, a more complex set of power control command may be utilized, including command which indicate the transmit power should be adjusted by one of a set of possible increments, or by no amount at all, or that only one particular channel in the reverse link signal should be adjusted. For example, a power control command requesting an adjustment in the transmit power of the traffic channel may be generated.

During transmit processing, encoder 131 performs convolutional coding on user data 132 generating code symbols 134. User data 132 is typically digitized and vocoded voice, although other types of digital data may be used. Multiplexer 122 multiplexes reverse link power control command 121 from power control command generator 120 with code symbols 134. In alternative embodiments of the invention power control command 121 may be punctured into code symbols 134, or a second channel code may be used to generate a separate power control channel over which reverse link power control command 121 is transmitted.

Channel modulator and spreader 128 modulates the data from multiplexer 122 with both a channel code and a PN spreading code generating spread data 130. Spread data 130 is summed with other spread data from other forward link channels by summer 135 generating summed data 136. Transmitter 138 upconverts summed data 136 and the upconverted RF signal is transmitted from antenna system 100 by way of diplexer 104.

By generating power control command 121 based on the energy of the pilot channel, rather than the traffic channel, a more accurate power control command is generated because the pilot channel is transmitted with a relatively constant or slow changing transmit power. This is in contrast to the traffic channel which is transmitted at a varying transmit power in response to changes in voice activity as described above. Generating a more accurate reverse link power control command enhances the overall performance of the CDMA cellular telephone system because the transmit power of each reverse link signal is kept closer to the minimum necessary to conduct communications. Increasing the performance of the CDMA cellular telephone system, or any other CDMA wireless communication system, utilizes the available RF bandwidth more efficiently.

Thus, an improved method for providing reverse link power control has been described. The invention can be incorporated into both terrestrial as well as satellite based wireless communication systems, as well as wire based communication systems over which sinusoidal signals are transmitted such as coaxial cable systems. Also, while the invention is described in the context of a 1.2288 MHz bandwidth signal, the use of other bandwidths is consistent with the operation of the invention including 2.5 MHz and 5.0 MHz systems. Furthermore, while the invention is described in the context of a reverse link signal, it may also be used in other types of transmissions including the forward link signal. In a preferred embodiment of the invention, the various systems described herein are implemented using semiconductor integrated circuits coupled via conduct, inductive, and capacitive connections, the use of which is well known in the art.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I (we) claim:

1. A method for performing transmit power control at a subscriber unit on a reverse link signal transmitted at a reverse link transmit power, wherein the reverse link signal has a traffic channel transmitted at a traffic channel transmit power, and a pilot channel transmitted at a pilot channel transmit power, comprising the steps of:

measuring at a base station a receive energy of the reverse link pilot channel;

generating a power control command in accordance with a comparison of said receive energy measurement with an energy threshold, wherein said power control command comprises an increase or decrease command;

receiving said power control command at said subscriber unit;

examining said power control command at said subscriber unit to determine whether the command is to be applied to either the reverse link traffic channel, the reverse link pilot channel, or the entire reverse link signal; and selectively adjusting the transmit power of either the reverse link pilot channel, the reverse link traffic channel, or the entire reverse link signal in accordance with the examining step.

2. The method as set forth in claim 1 further comprising the step of transmitting said power control command via a forward link signal.

3. The method as set forth in claim 1, wherein the reverse link traffic channel is received at a set of power levels and a corresponding set of transmission rates.

4. The method as set forth in claim 1, wherein the step of measuring and the step of generating are continuously performed throughout transmission of said reverse link traffic channel.

5. The method as set forth in claim 1, wherein the step of selectively adjusting is also performed in response to a measurement of a forward link receive energy.

6. A system for performing transmit power control at a subscriber unit on a reverse link signal transmitted at a reverse link transmit power, wherein the reverse link signal has a traffic channel transmitted at a traffic channel transmit power, and a pilot channel transmitted at a pilot channel transmit power, comprising:

power control system that measures at a base station a receive energy of the reverse link pilot channel, for generating a power control command in accordance with a comparison of said receive energy measurement with an energy threshold, wherein said power control command comprises an increase or decrease command;

receiver at said subscriber unit that receives said power control command;

examination system that examines at said subscriber unit said power control command to determine whether the command is to be applied to either the reverse link traffic channel, the reverse link pilot channel, or the entire reverse link signal; and a power controller that selectively adjusts the transmit power of either the reverse link pilot channel, the reverse link traffic channel, or the entire reverse link signal in accordance with said examination by said examination system.

7. The system as set forth in claim 6, wherein said receiver receives said power control command via a forward link signal.

8. The system as set forth in claim 6, wherein said base station receives the reverse link traffic channel at a set of power levels and a corresponding set of transmission rates.

9. The system as set forth in claim 6, wherein said power control system continuously measures said receive energy of the reverse link pilot channel throughout transmission of said reverse link traffic channel, and continuously generates said power control command throughout transmission of said reverse link traffic channel.

10. The system as set forth in claim 6, wherein said power controller selectively adjusts the transmit power of either the reverse link pilot channel, the reverse link traffic channel, or the entire reverse link signal further in response to a measurement of a forward link receive energy.

\* \* \* \* \*